US009653221B2

(12) United States Patent
Gadkaree et al.

(10) Patent No.: US 9,653,221 B2
(45) Date of Patent: May 16, 2017

(54) METHOD OF MAKING A CARBON COMPOSITION FOR AN ANODE (71) Applicant: Corning Incorporated, Corning, NY (US)

(72) Inventors: Kishor Purushottam Gadkaree, Painted Post, NY (US); Rahul Suryakant Kadam, Corning, NY (US); Andrew Fleitz Husted, Wellsburg, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/377,395

(22) Filed: Dec. 13, 2016

(65) Prior Publication Data

US 2017/0092441 A1 Mar. 30, 2017

Related U.S. Application Data (62) Division of application No. 14/610,782, filed on Jan. 30, 2015, now Pat. No. 9,552,930.

(51) Int. Cl.
| | |
|---|---|
| *B01J 20/20* | (2006.01) |
| *H01G 11/34* | (2013.01) |
| *H01G 11/86* | (2013.01) |
| *C01B 31/02* | (2006.01) |
| *H01G 11/50* | (2013.01) |
| *H01G 11/42* | (2013.01) |
| *H01G 11/38* | (2013.01) |
| *H01G 11/06* | (2013.01) |
| *H01G 11/44* | (2013.01) |

(52) U.S. Cl.
CPC .............. *H01G 11/86* (2013.01); *B01J 20/20* (2013.01); *C01B 31/02* (2013.01); *H01G 11/06* (2013.01); *H01G 11/34* (2013.01); *H01G 11/38* (2013.01); *H01G 11/42* (2013.01); *H01G 11/44* (2013.01); *H01G 11/50* (2013.01); *C01P 2006/40* (2013.01)

(58) Field of Classification Search
CPC .............................. B01J 20/20; B01J 502/416
See application file for complete search history.

(56) References Cited

U.S. PATENT DOCUMENTS

| | | | |
|---|---|---|---|
| 6,631,073 B1* | 10/2003 | Sakata ................... | H01G 11/34 361/303 |
| 7,283,349 B2 | 10/2007 | Yoshida et al. | |
| 7,582,902 B2 | 9/2009 | Tano et al. | |
| 7,625,839 B2 | 12/2009 | Hirahara et al. | |
| 7,964,173 B2 | 6/2011 | Oyama et al. | |
| 8,142,930 B2 | 3/2012 | Kojima et al. | |
| 8,318,356 B2 | 11/2012 | Gadkaree et al. | |
| 8,524,632 B2 | 9/2013 | Gadkaree et al. | |
| 8,541,338 B2 | 9/2013 | Gadkaree et al. | |
| 8,652,995 B2 | 2/2014 | Gadkaree et al. | |
| 8,784,764 B2 | 7/2014 | Gadkaree et al. | |
| 9,108,852 B1 | 8/2015 | Gadkaree et al. | |
| 2002/0096661 A1* | 7/2002 | Shinozaki ............... | C01B 31/12 252/500 |
| 2003/0179537 A1* | 9/2003 | Tanaka .................... | C01B 31/12 361/502 |
| 2008/0165471 A1 | 7/2008 | Kojima et al. | |
| 2009/0214949 A1 | 8/2009 | Ugawa | |
| 2011/0002086 A1 | 1/2011 | Feaver | |
| 2011/0182000 A1 | 7/2011 | Gadkaree | |
| 2011/0261501 A1 | 10/2011 | Gadkaree et al. | |
| 2012/0134075 A1 | 5/2012 | Kawai | |
| 2013/0148265 A1 | 6/2013 | Okuno | |
| 2013/0194721 A1 | 8/2013 | Cho et al. | |
| 2013/0201606 A1 | 8/2013 | Nansaka et al. | |
| 2013/0202945 A1 | 8/2013 | Zhamu et al. | |
| 2013/0209348 A1 | 8/2013 | Ludvik et al. | |
| 2014/0079994 A1 | 3/2014 | Affinito et al. | |
| 2014/0101992 A1 | 4/2014 | Mennell et al. | |
| 2014/0134438 A1 | 5/2014 | Gadkaree et al. | |
| 2014/0146440 A1 | 5/2014 | Gadkaree et al. | |
| 2014/0177136 A1 | 6/2014 | Kim et al. | |
| 2014/0293507 A1 | 10/2014 | Gadkaree et al. | |
| 2015/0287545 A1* | 10/2015 | Ogawa ................... | H01G 11/32 361/502 |

(Continued)

FOREIGN PATENT DOCUMENTS

| | | |
|---|---|---|
| CN | 10126539 A | 9/2008 |
| EP | 0767505 A1 | 4/1997 |

(Continued)

OTHER PUBLICATIONS

International Search Report and Written Opinion PCT/US2013/015244 Dated Jun. 2, 2016.
International Search Report and Written Opinion PCT/US2016/015033 Dated May 10, 2016.
International Search Report and Written Opinion PCT/US2016/015041 Dated Jun. 13, 2016.
International Search Report and Written Opinion PCT/US2016/015245 Dated May 12, 2016.
Shu et al. J., "Electrochemical intercalation of litium into graphrte", J. Electrochem. Soc., Electrochem. Soc., vol. 140, No. 4, 922-927, Apr. 1993.

(Continued)

*Primary Examiner* — Dion R Ferguson
(74) *Attorney, Agent, or Firm* — John L. Haack (57) ABSTRACT

An anode in a lithium ion capacitor, including:
  a carbon composition comprising: a coconut shell sourced carbon in from 85 to 95 wt %; a conductive carbon in from 1 to 10 wt %; and a binder in from 3 to 8 wt %; and
  an electrically conductive substrate,
wherein the coconut shell sourced carbon has a disorder (D) peak to graphitic (G) peak intensity ratio by Raman analysis of from 1.40 to 1.85; and by elemental analysis a hydrogen content of from 0.01 to 0.25 wt %; a nitrogen content of from 0.01 to 0.55 wt %; and an oxygen content of from 0.01 to 2 wt %.
Also disclosed are methods of making and using the carbon composition.

5 Claims, 5 Drawing Sheets

(56) References Cited

U.S. PATENT DOCUMENTS

2016/0087263 A1 3/2016 Gadkaree et al.
2016/0133394 A1 5/2016 Sakshaug et al.

FOREIGN PATENT DOCUMENTS

| | | |
|---|---|---|
| EP | 2958122 | 12/2015 |
| JP | 2004266239 A | 9/2004 |
| JP | 2005302300 | 10/2005 |
| JP | 2006086148 A | 3/2006 |
| JP | 2008289820 A | 12/2008 |
| JP | 2010118216 A | 5/2010 |

OTHER PUBLICATIONS

International Search Report and Written Opinion PCT/US2016/015273 Dated Apr. 15, 2016.
International Search Report and Written Opinion PCT/US2015/061796 Dated Apr. 13, 2016.
Lastoskie et al. "Pore Size Distribution Analysis of Microporous Carbons: A Density Function Theory Approach", J. Phys. Chem. 1993, 97, 4786-4796.
Chang et al., The Influence of Different Electrode Fabrication Methods and Poly(Vinylidene Fluoride) Binders on the Anode Electrode Dimension Stability and Cyclability in Lithium-Ion Batteries, Journal of New Materials for Electrochemical Systems 11, 43-47 (2008).
Liu et al., Particles and Polymer Binder Interaction: A Controlling Factor in Lithium-Ion Electrode Performance, Journal of the Electrochemical Society, 159(3), A214-A221 (2012).
Yoo et al., Interaction of Poly(vinylidene fluoride) with Graphite Particles. 1. Surface Morphology of a Composite Film and Its Relation to Prtocessing Parameters, Chem. Mater., 15, 850-861 (2003).
Yoo et al., Interaction of Poly(vinylidene fluoride) with Graphite Particles. 2. Effect of Solvent Evaporation Kinetics and Chemical Properties of PVDF on the Surface Morphology of a Composite Film and Its Relation to Electrochemical Performance, Chem. Mater., 16, 1945-1953 (2004).

* cited by examiner

METHOD OF MAKING A CARBON COMPOSITION FOR AN ANODE

CROSS-REFERENCE TO RELATED APPLICATIONS

This application is a divisional of and claims priority from and the benefit of U.S. application Ser. No. 14/610,782, filed on Jan. 30, 2015, and entitled "ANODE FOR LITHIUM ION CAPACITOR," the content of which is relied upon and incorporated herein by reference in its entirety.

The entire disclosure of each publication or patent document mentioned herein is incorporated by reference.

BACKGROUND

The disclosure relates to a lithium ion capacitor (LIC), to an anode in the LIC, and to a composition in the anode.

SUMMARY

In embodiments, the disclosure provides a carbon composition for an anode in a lithium ion capacitor.

In embodiments, the disclosure provides an anode for a lithium ion capacitor having a low surface area carbon obtained from an inexpensive carbon source, such as coconut shell.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Features or aspects recited in any of the claims are generally applicable to all facets of the invention. Any recited single or multiple feature or aspect in any one claim can be combined or permuted with any other recited feature or aspect in any other claim or claims.

Definitions

"Anode," "anode electrode," "negative electrode," or like terms refers to an electrode through which positive electric charge flows into a polarized electrical device and electrons flow out of the electrode to an outside circuit.

"Cathode," "cathode electrode," "positive electrode," or like terms refers to an electrode from which positive electric charge flows out of a polarized electrical device.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Lithium ion capacitors (LICs) are a new class of innovative hybrid energy storage devices. Unlike EDLC's, which store energy based on double layer mechanism on both electrodes, the hybrid lithium ion capacitors store energy on the cathode via the double layer mechanism whereas energy storage on the anode is via Faradaic mechanism. As a result, the energy density in such devices can be, for example, five times greater than an EDLC, while maintaining the power also at a 3 to 4 times greater than an EDLC's power. Despite the Faradaic mechanism of energy storage, these LIC devices still show very high cycle life, for example, in excess of 200,000 cycles, making the devices attractive for many applications. LICs utilize a high surface area (typically greater than 1,000 $m^2/g$) carbon on the positive electrode and an intercalating carbon with low porosity and low surface area (typically less than 300 $m^2/g$) on the anode, which combination of a high and a low surface area carbon supports fast intercalation and de-intercalation of lithium ions. During charge and discharge, lithium intercalation and de-intercalation occurs within the bulk of the negative electrode (i.e., the anode), whereas anion adsorption and desorption takes place on the positive electrode (i.e., the cathode). The adsorption and desorption on the positive electrode is a non-Faradaic reaction, which is relatively faster than the lithium ion intercalation and de-intercalation on the negative electrode.

In the lithium ion capacitor, as mentioned above, the negative electrode (intercalating and de-intercalating) can be pre-doped with lithium metal. The pre-doping of the lithium ion capacitor allows an increase in the voltage to approximately about 3.8 volts.

A lithium ion capacitor permits a voltage of about 1.5 times that of an EDLC. The cell capacitance (C=Q/V) can be stated by the charge-discharge curve. Since the energy density and power are both proportional to square of the voltage there is a significant increase in energy and power density of the device. In addition to the voltage related increase, the Faradaic reaction also has significantly greater energy associated with it and contributes to an increase in the energy and the power density. The negative electrode stays at a constant or even potential during the charging and discharging of the cell.

Properties of the negative electrode or anode are significant to the performance of the device. These properties are derived mainly from the materials comprising the negative electrode. The carbon materials comprising the negative electrode are significant to the performance of the device. The properties required for the Li ion capacitor anode are different from properties required for Li ion battery anodes, although both involve insertion of lithium ions in the carbon structure. The Li ion capacitor is a power device and hence a fast intercalation—deintercalation of ions is essential, whereas for Li ion batteries a slow intercalation rate is acceptable. In embodiment, the disclosure provides a carbon for the use in an anode electrode of a lithium ion capacitor. The data provided was obtained at desired high charge-discharge rates.

Different types of carbons have been evaluated as anode materials of lithium ion capacitors. Graphite has been used mainly as the material of choice, but hard carbon materials, i.e., non-graphitic materials having a low surface area are also being used. Hard carbon materials show superior discharge capacities compared to graphite due to structural differences between the hard carbon and graphite.

Charge and discharge capacity is a quantitative measure of charge being stored and discharged, respectively, during the charge-discharge process. Discharge capacity is an intrinsic property of a carbon material. The higher the discharge capacity, the higher the energy density of the device. The discharge capacity of the carbon material can depend on, for example, the structure of the carbon and the impurity levels present in the carbon material.

The disclosure provides experimental support that shows the superior rate performance of coconut shell sourced carbon compared to a graphite (i.e., a standard material used in published studies), a phenolic resin (660° C.) (comparative commercial material), and coconut shell sourced carbon carbonized at 600° C., and at 1000° C. Coconut shell sourced carbon that was carbonized at 1200° C., at 1400° C., and at 1600° C., shows superior rate performance especially at higher rates (higher currents).

The disclosure provides experimental data for the disclosed carbon composition, an anode, and an LIC, which data includes a performance comparison as the anode material in Li ion capacitors of the disclosed anode carbon with anode carbons made from various different raw materials, such as carbon produced from a phenolic resin, and from a graphite.

The carbon products produced from the coconut shell carbonized at 1200° C., the coconut shell carbonized at 1400° C., and the coconut shell carbonized at 1600° C. showed the highest discharge capacities compared to the other carbons and their respective treatments.

Rate performance is significant as a capacitor device is subjected to high rate charge-discharge cycles unlike batteries where the charge discharge rates are orders of magnitude lower.

In embodiments, the disclosure includes high performance active materials for lithium ion capacitors, and electrodes fabricated from these materials. The disclosure also includes a method of making the electrode from a carbon composition, which carbon composition is used as an anode in a lithium ion capacitor.

In embodiments, the disclosure provides a carbon composition for an anode in a lithium ion capacitor.

In embodiments, the disclosure provides an anode for a lithium ion capacitor having a low surface area carbon obtained from an inexpensive carbon source, such as coconut shell.

In embodiment, the disclosure provides a hard carbon, which shows superior discharge capacities compared to other hard carbons or graphite. Additionally, the disclosed carbon has superior rate performance, especially at high rates, leading to higher power and superior performance. The material, method of making and use, and the device performance is provided below and is compared with prior art materials.

In embodiments, the disclosure provides a performance comparison of the disclosed hard carbon prepared from a coconut shell source with a graphite and with carbons produced from different raw materials such as commercial phenolic resin.

In embodiments, the disclosure provides a method of making a carbon as an anode material in a lithium ion capacitor. The disclosure includes the performance comparison of anodes containing a coconut shell derived hard carbon with carbons produced from different raw materials such as a phenolic resin and a commercial graphite. This disclosure identifies fundamental aspects of the performance of the lithium ion capacitor with the coconut shell sourced activated carbon as an electrode material on the anode side and compares it to the activated carbons sourced from the phenolic resin and the graphite.

A carbonaceous material used on an anode electrode in a lithium ion capacitor is known to intercalate and de-intercalate lithium ions (see J. Electrochem. Soc., Vol. 140, No. 4, 922-927, April 1993). Charge and discharge capacity is a quantitative measure of the carbon's ability to store charge or discharge charge. Discharge capacity is an intrinsic property of a carbon. The discharge capacity of the carbon can depend on, for example, the structure of the carbon and the impurity levels in the carbon. The discharge capacities can directly reflect on the performance aspects of an energy cell. A higher discharge capacity is a desirable property in a carbon on the anode side as the carbon will directly and positively affect the packaging volume of a cell, which in turn will positively affect the energy and power density in a lithium ion capacitor device. It is significant to note that the capacity must be measured at high discharge rates since a capacitor is a power device, unlike an energy device such as a battery, where the discharge rates are significantly lower. The capacity of a material at high discharge rates will be different than at low discharge rates and will be a function of the structure of the material, which structure controls the diffusion rate of lithium ions into the structure of the materials.

In embodiments, the disclosure provides an anode in a lithium ion capacitor, comprising:
a carbon composition comprising: a coconut shell sourced carbon in from 85 to 95 wt %; a conductive carbon in from 1 to 10 wt %; and a binder in from 3 to 8 wt %, based on 100 wt % of the carbon composition; and
an electrically conductive substrate, e.g., a copper or aluminum foil,
wherein the coconut shell sourced carbon composition has a disorder (D) peak to graphitic (G) peak intensity ratio by Raman analysis of from 1.40 to 1.85; a hydrogen content of from 0.01 to 0.25 wt %; a nitrogen content of from 0.01 to 0.55 wt %; and an oxygen content of from 0.01 to 2 wt %.

In embodiments, the coconut shell sourced carbon can be, for example, present in from 88 to 92 wt %; the conductive carbon can be, for example, present in from 4 to 7 wt %; and the binder is PVDF and can be, for example, present in from 4 to 6 wt % and the PVDF has a molecular weight of from 300,000 to 1,000,000.

In embodiments, the coconut shell sourced carbon composition can have, for example, a disorder (D) peak to graphitic (G) peak intensity ratio by Raman analysis of from 1.48 to 1.8.

In embodiments, the coconut shell sourced carbon can have, for example, a hydrogen content of from 0.01 to 0.24 wt %; a nitrogen content of from 0.03 to 0.5 wt %; an and oxygen content of from 0.01 to 1.9 wt %, including intermediate values and ranges.

In embodiments, the coconut shell sourced carbon can have, for example, a relatively low surface area of from 1 to 100 $m^2/g$, such as from 10 to 75 $m^2/g$, from 20 to 50 $m^2/g$, and like areas, including intermediate values and ranges.

In embodiments, the coconut shell sourced carbon can have a particle size, for example, from 1 to 30 microns, from 2 to 7 microns, and like particle sizes, including intermediate values and ranges.

In embodiments, the anode operates at a high charge-discharge rate, for example, of from 1 C to 4000 C, including intermediate values and ranges.

In embodiments, the lithium ion capacitor can further comprise, for example: a cell comprising: the abovementioned anode in combination with a stacked cathode comprising an a heat and KOH activated wheat flour sourced carbon, e.g., 85% Corning carbon (mentioned below), a fluoropolymer, e.g., 10% PTFE DuPont 601A Teflon, a conductive carbon black, e.g., 5% Cabot Black Pearl 2000, a separator, e.g., NKK-4425, and a lithium composite powder (mentioned below) on the anode.

In embodiments, the cell can have a discharge capacity, for example, of from 60 to 120 mAh/gm, such as 96.32 mAh/gm based on the anode carbon weight, and a maximum energy density, for example, of from 20 to 60 Wh/l, such as 44.77 Wh/l.

In embodiments, the disclosure provides a method of making the above mentioned carbon composition comprising:
a first heating (e.g., carbonizing) of a coconut shell sourced carbon at from 1000° C. to 1700° C. for 0.5 hrs to 5 hrs in an inert atmosphere; and
grinding the resulting carbon to a powder.

In embodiments, the method of making can further comprise, for example, washing the resulting powder with an aqueous acid (e.g., HCl). In embodiments, the method of making can further comprise, for example, a second heating (i.e., re-heating) of the aqueous acid washed powder at from 1000° C. to 1700° C.

In embodiments, the first and second heating can be accomplished, for example, at from 1000° C. to 1600° C. for 1 to 3 hrs.

In embodiments, at least one of the first heating and second can be accomplished at, for example, 1100 to 1300° C., 1150 to 1250° C., including intermediate values and ranges.

In embodiments, at least one of the first heating and second can be accomplished at, for example, 1300 to 1500° C., 1350 to 1450° C., including intermediate values and ranges.

In embodiments, at least one of the first heating and second can be accomplished at, for example, 1500 to 1700° C., 1550 to 1650° C., including intermediate values and ranges.

In embodiments, the disclosure provides a carbon composition prepared by the above mentioned method. The disclosed carbon composition is particularly useful in, for example, lithium ion capacitor applications.

The present disclosure is advantaged is several aspects, including for example: high discharge capacity carbons, high rate performance for improved power performance, and reduced production costs.

Figure 2:
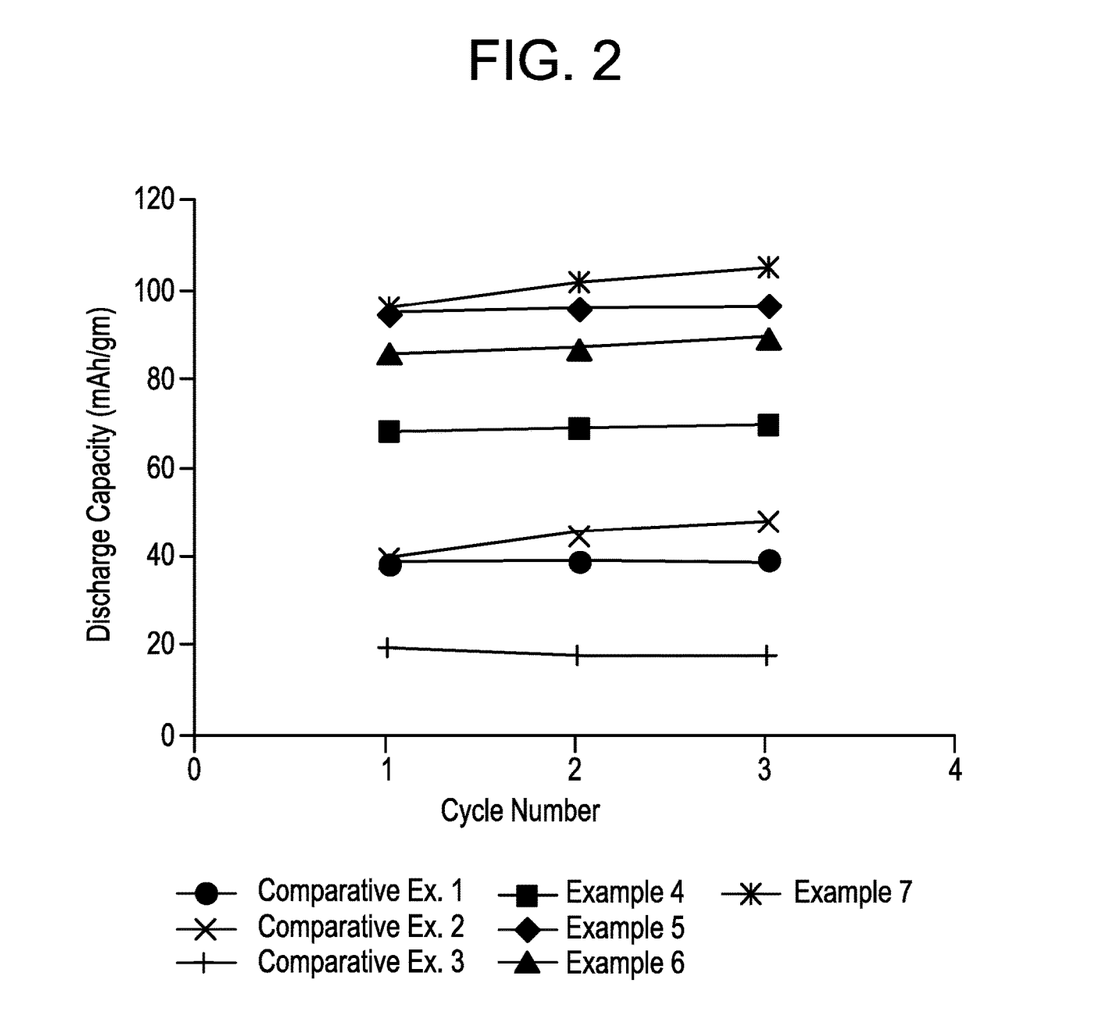
FIG. 2 shows discharge capacities from conditioning cycles for carbon based on different raw materials (discharge capacity normalized based on anode carbon weight). These capacities are measured at C/2 rate.

Coconut shell sourced hard carbon was determined to have high discharge capacities and superior rate performance. Referring to the figures, FIG. 2 shows the discharge capacities (normalized on the anode carbon weight, measured at C/2 rate) during the conditioning cycles for a phenolic resin sourced carbon (where the resin was carbonized at 660° C.), a coconut shell carbon (carbonized at 1600° C., 1400° C., 1200° C., 1000° C., and 600° C.), and graphite.

The discharge capacities (FIG. 2) for coconut shell sourced carbon that was carbonized at 1200° C., 1400° C., and 1600° C., were higher than the phenolic resin sourced carbon that was carbonized at 660° C., the coconut shell sourced carbon that was carbonized at 600° C., the coconut shell carbon that was carbonized at 1000° C., and graphite. The coconut shell sourced carbon that was carbonized at 1000° C., washed with HCl, and retreated at 1000° C., showed a higher discharge capacity of 70.59 mAh/gm compared to the phenolic resin sourced carbon that was carbonized at 660° C. (39.37 mAh/gm), the coconut shell sourced carbon that was carbonized at 600° C. (18.20 mAh/gm), and the graphite (48.46 mAh/gm), after three conditioning charge-discharge cycles.

Coconut shell carbons carbonized at 1200° C., 1400° C., and 1600° C., showed a higher discharge capacity of 96.32 mAh/gm, 88.64 mAh/gm, and 105.39 mAh/gm, respectively, when compared to: the coconut shell carbon that was carbonized at 1000° C., washed with HCl and retreated at 1000° C., which had a discharge capacity of 70.59 mAh/gm; a phenolic resin carbonized at 660° C. had a discharge capacity of 39.37 mAh/gm; a coconut shell carbon carbonized at 600° C. had a discharge capacity of 18.20 mAh/gm; and graphite had a discharge capacity of 48.46 mAh/gm, each after three conditioning charge discharge cycles.

This desirable trait of the coconut shell sourced carbon translates into a positive effect in the energy density and power density (rate performance) for a lithium ion capacitor constructed with the coconut shell sourced carbon that was carbonized at 1200° C., 1400° C. and 1600° C., respectively.

Figure 3:
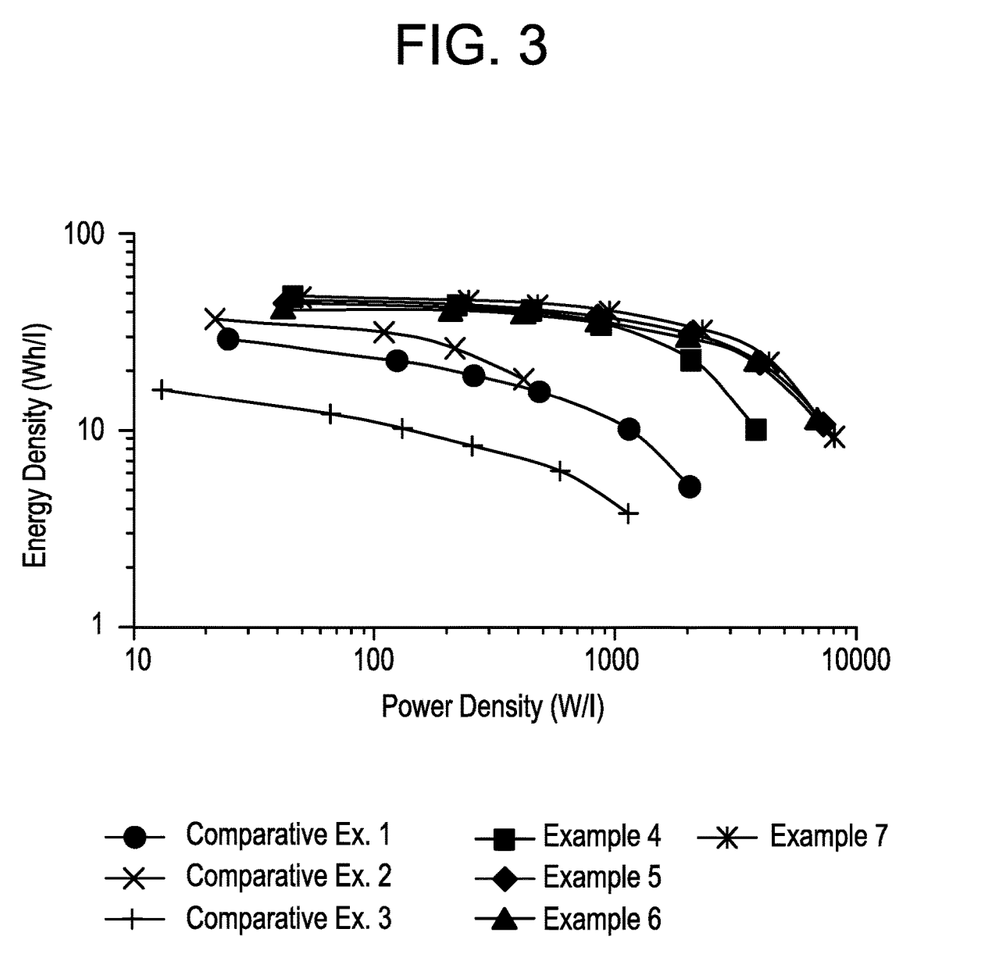
FIG. 3 shows volumetric Ragone plot comparing the rate performances of seven carbons from different raw materials.

FIG. 3 shows a rate performance comparison for seven different carbons, i.e., carbon produced from a phenolic resin source, a coconut shell source, and a graphite. The carbon made from (i.e., sourced) the coconut shell carbon and that was carbonized at 1000° C., washed with HCl, and retreated at 1200° C., 1400° C., or 1600° C., respectively, showed the best rate performance at higher C-rates. The carbon made from coconut shell carbon and that was carbonized at 1000° C., washed with HCl, and retreated at 1200° C., 1400° C., or 1600° C., showed higher energy densities and power densities compared to the other four carbons at low, medium, and high rates. However, the coconut shell carbon that was carbonized at 1000° C., washed with HCl, and retreated at 1200° C., 1400° C., or 1600° C., showed superior performance at higher discharge rates. The carbonization temperature can have a significant impact on the discharge capacity. Although not limited by theory, the impact of carbonization temperature on the discharge capacity might be explained by the changing structure of the carbon with the changing carbonization temperature as seen from Raman data given above.

In embodiments, the disclosure provides a coconut shell hard carbon having high discharge capacities and superior rate performance. FIG. 2 shows the discharge capacities (normalized on the anode carbon weight, measured at C/2 rate) during the conditioning cycles for a phenolic resin sourced carbon (that was carbonized at 660° C.), a coconut shell sourced carbon (that was carbonized at 1600° C., 1400° C., 1200° C., 1000° C., or 600° C.), and graphite.

Data is also provided for the performance of coconut shell sourced carbons produced by different treatment conditions. Three different conditions were evaluated: a coconut shell sourced carbon that was carbonized at 1000° C.; a coconut shell sourced carbon that was carbonized at 1000° C. followed by wash with HCl; a coconut shell sourced carbon that was washed with HCl, and was then carbonized to 1000° C., and compared to the coconut shell sourced or based carbon that was carbonized at 1000° C., washed with HCl, and retreated at 1000° C.

Figure 4:
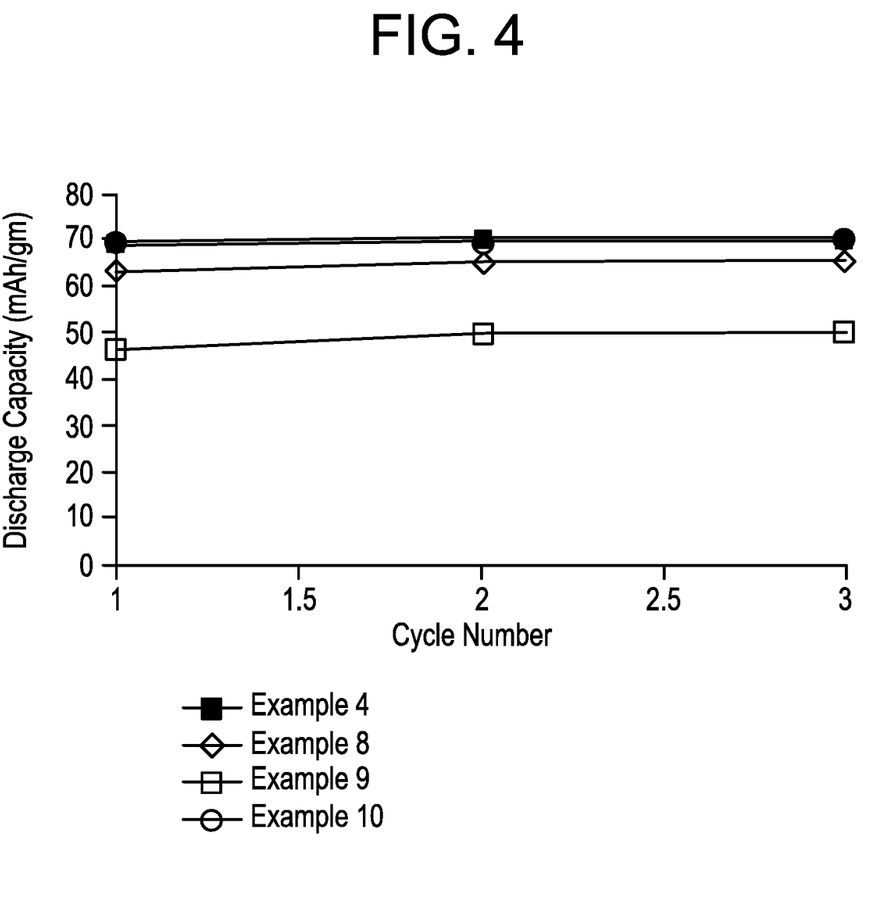
FIG. 4 shows discharge capacities in mAh/gm (based on anode carbon weight-C/2 rate) from conditioning cycles for coconut shell carbon treated with different conditions.

FIG. 4 shows the discharge capacity for three conditioning cycles for three different coconut shell carbons produced by different treatment conditions compared to the coconut shell based carbon carbonized at 1000° C., washed with HCl, and retreated at 1000° C. A higher discharge capacity (70.59 mAh/gm) was observed for coconut shell carbon carbonized at 1000° C., washed with HCl, and retreated at 1000° C., when compared to the other two conditions, i.e., coconut shell carbon carbonized at 1000° C. (65.97 mAh/gm), coconut shell carbon carbonized at 1000° C. followed by wash with HCl (50.32 mAh/gm). The coconut shell carbon made by washing raw coconut shell flour/granules followed by carbonization at 1000° C. showed comparable discharge capacity (69.61 mAh/gm) when compared to coconut shell carbon carbonized at 1000° C., washed with HCl and retreated at 1000° C.

Figure 5:
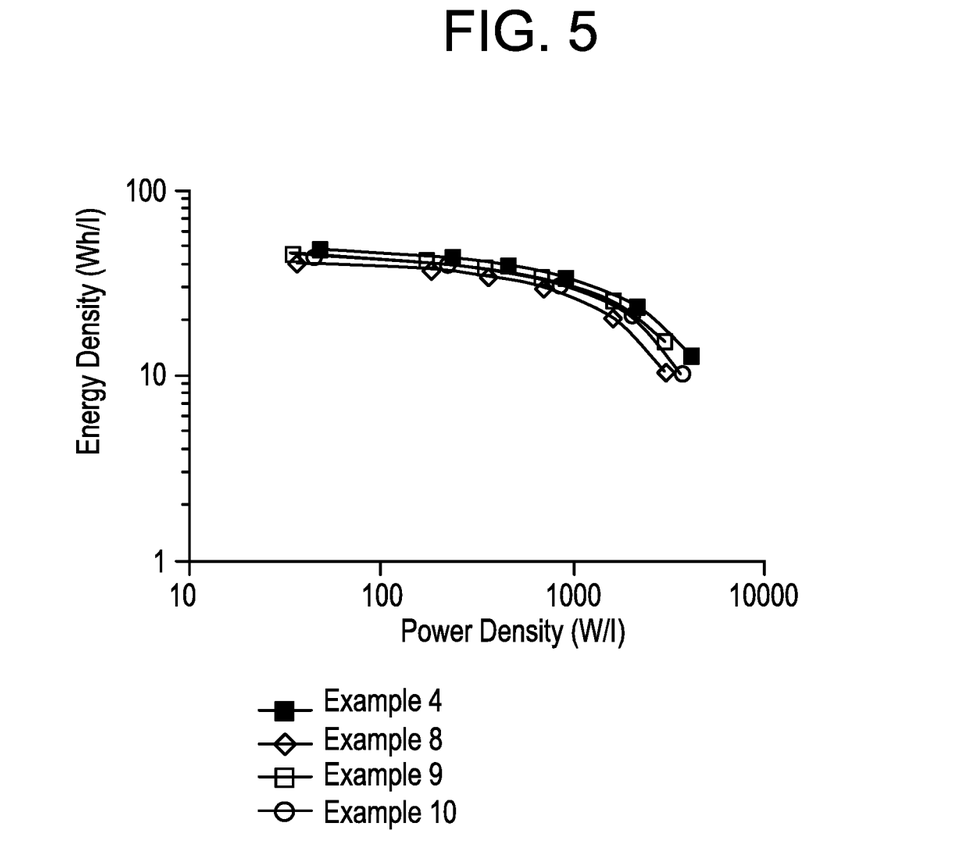
FIG. 5 shows a volumetric Ragone plot comparing coconut shell carbon treated with the different conditions.

FIG. 5 shows the rate performance for three different coconut shell carbons treated under different conditions and compared to a coconut shell carbon carbonized at 1000° C., washed with HCl, and retreated at 1000° C. The coconut shell carbon carbonized at 1000° C. followed by HCl washing, and second treatment at 1000° C. showed the best rate performance (volumetric). The coconut shell carbon that was carbonized at 1000° C. followed by HCl washing, and a second treatment at 1000° C. showed higher energy and power density at higher current rates. The coconut shell carbon made by washing raw coconut shell flour/granules followed by carbonization at 1000° C. showed comparable rate performance to the coconut shell carbon made by carbonization at 1000° C. followed by HCl washing, and a second treatment at 1000° C. and had lower current rates but slightly lower performances at higher current rates. Overall, the disclosed coconut shell carbon made by carbonization at 1000° C. followed by HCl washing, and a second treatment at 1000° C. had higher discharge capacities and superior rate performance of all the different carbons evaluated. The HCl washing and 1000° C. treatment plays a significant role in removing trace metallic and organic impurities from the carbon. The added HCl washing and the second 1000° C. treatment assists in providing better performance (i.e., capacity and rate performance) of the carbon.

EXAMPLES

The following Examples demonstrate making, use, and analysis of the disclosed activated carbon, LIC anode, LIC, and methods in accordance with the above general procedures.

Comparative Example 1

Figure 1:
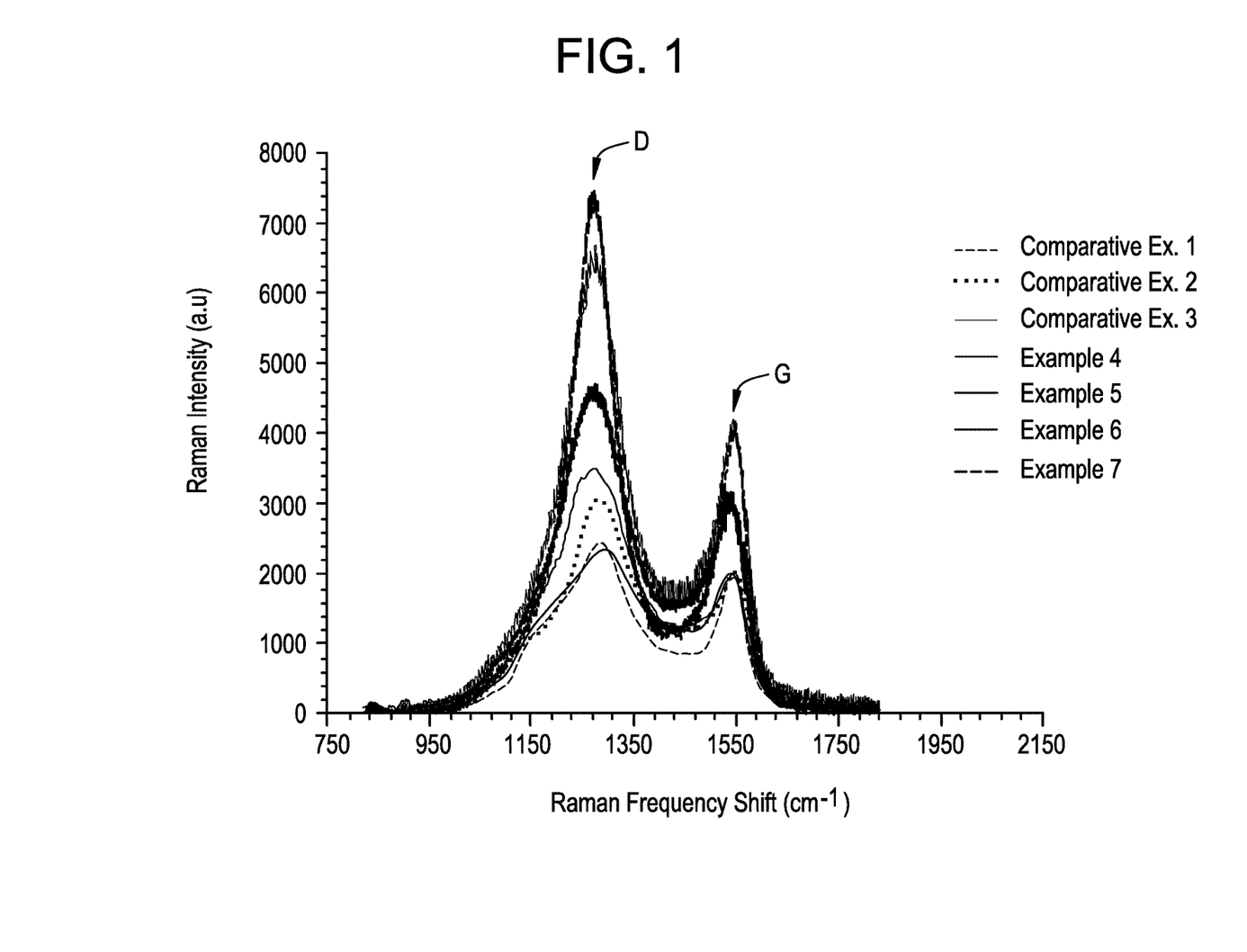
FIG. 1 shows Raman spectra comparing frequency shifts and peak intensities of different carbons.

Phenolic Resin Source Carbon at 660° C. (Mentioned in US 2013/0201606A1) A phenolic resin, GP® 510D50 REST-SET® Phenolic Impregnating Resin, was acquired from Georgia Pacific and cured at 100 to 125° C. A phenolic resin plate was also prepared by curing the phenolic resin at 100 to 120° C. and then ground to a fine powder. The resin was then placed in a retort furnace and heated at 50° C./hr to 500° C. The furnace temperature was then held at 500° C. for 1 hr. The furnace was then ramped at 10° C./hr to 660° C. The furnace was then held at 660° C. for 1 hr. The furnace was switched off and passively cooled. The resulting carbon was ground to a 5 micron particle size. The ground carbon was subjected to Raman spectroscopy for structure analysis. The stacked Raman spectra are shown in FIG. 1. The phenolic resin sourced carbon treated at 660° C. shows an $I_D$ peak (disorder peak) at 1308.83 cm$^{-1}$ with an intensity of 2339.745 a.u., and an $I_G$ peak at about 1601.01 cm$^{-1}$ with an intensity of 1952.962 a.u. (Table 1). The peak ratio of $I_D/I_G$ for the phenolic resin sourced carbon treated at 660° C. was 1.1980. The phenolic resin sourced carbon was also subjected to relative percentage carbon, hydrogen, nitrogen, and oxygen elemental analysis. The samples were dried under vacuum at 125° C. for 6 hrs prior to the analysis. All the elemental results are reported on a dried basis and are summarized in Table 2. Found: C: 95.27%, H: 1.76%, N: 0.1%, and O: 2.11%. The phenolic resin sourced carbon was also subjected to BET analysis to probe the surface area of the carbon, which was 426.8621 m$^2$/gm.

The resulting carbon was used in casting anode electrodes for a lithium ion capacitor. The anode consisted of 90 wt % of the ground phenolic resin sourced carbon, 5 wt % Timcal Super C-45 conductive carbon, and 5 wt % of KYNAR HSV 900 grade PVDF (molecular weight: 1,000,000) as a binder.

The anode was prepared as follows. 3.6 grams of the ground phenolic resin sourced carbon and 0.2 grams of Timcal Super C-45 were balled milled in a Retsch PM-100 ball mill for 15 mins at 350 rpm. 0.2 gram of PVDF was added to the milled mixture of phenolic resin sourced carbon and the Timcal Super C-45, and the mixture was ball-milled for 15 mins at 350 rpm. Several drops of N-methyl pyrrolidinone (NMP) were added to the mixture to form a paste of the mixture. The paste was then coated on a copper foil (Product number—Oak Mitsui TLB-DS), and passed through a rolling mill to produce the 4 mil thickness. Then 5 mg of lithium composite powder (LCP; is used for pre-doping the anode) was coated on an anode made from the ground phenolic resin sourced carbon 660° C. The calendared anode electrodes were punched to make 14 mm diameter circular electrodes. The punched anode electrodes were the dried 16 hrs at 120° C. under vacuum.

A Li ion capacitor was built in a CR2032 format cell. The cathode consisted of 85 wt % of the activated Corning carbon mentioned below, 10 wt % PTFE (DuPont 601A Teflon PTFE), and 5 wt % Cabot Black Pearl 2000 (see for example, U.S. Pat. Nos. 8,318,356, 8,784,764, 8,524,632, and 8,541,338). The separator was NKK-4425 separator.

The lithium composite powder (LCP) is an encapsulated lithium particle comprising: a core comprised of at least one of: lithium; a lithium metal alloy; or a combination thereof; and a shell comprised of a lithium salt, and an oil, the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF").

The Corning carbon mentioned above was made from a wheat flour precursor. The wheat flour was carbonized at from 650 to 700° C. The carbonized carbon was ground to a particle size of approximately 5 microns. The ground carbonized carbon was then activated at 750° C. with KOH (alkali) in a weight ratio of 2.2:1 KOH:carbon for 2 hrs. The carbon was further washed with water to remove any remaining KOH. The resulting activated carbon was then treated with HCl to neutralize any trace of KOH and then washed with water to neutralize the carbon to a pH of 7. The activated carbon was then heat-treated under nitrogen and hydrogen forming gas at 900° C. for 2 hrs.

The cell was then crimped on an MTI coin cell crimper and conditioned on an Arbin BT 2000 and conditioned at constant current charge/discharge at 0.5 mA current from 3.8V to 2.2V. The ground phenolic resin source carbon had a discharge capacity of 39.374 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the phenolic resin source carbon on volume basis. The cell showed a maximum energy density of 29.44 Wh/l.

Comparative Example 2

Graphite The Timcal TB-17 graphite powder specially synthesized for Li ion electrode applications was acquired from MTI Corp., and used as received. The received carbon was subjected to Raman spectroscopy for structure analysis. The stacked Raman spectra are shown in FIG. 1. The graphite had an $I_D$ peak (disorder peak) at 1316.33 cm$^{-1}$ with an intensity of 3019.06 a.u., and an $I_G$ peak at approximately 1599.91 cm$^{-1}$ with an intensity of 2000.583 a.u. (Table 1). The peak ratio of $I_D/I_G$ was 1.51. The Timcal TB-17 graphite was subjected to elemental analysis as in Comparative Example 1. found: C: 99.4%; H: 0.27%; N: 0.02%; and O: less than 0.1%.

The graphite was used in casting anode electrodes for a lithium ion capacitor. The electrodes consisted of 90 wt % Timcal TB-17 graphite powder, 5 wt % Timcal Super C-45 conductive carbon from MTI Corp., and 5 wt % of KYNAR HSV 900 grade PVDF (molecular weight: 1,000,000) as a binder.

The anode was prepared as follows. 3.6 grams of the Timcal TB-17 graphite powder and 0.2 grams of the Timcal Super C-45 were balled milled in a Retsch PM-100 ball mill for 15 mins at 350 rpm. 0.2 grams of PVDF was added to the graphite and Timcal Super C-45 mixture and was ball-milled for 15 mins at 350 rpm. A few drops of N-methyl pyrrolidinone (NMP) were added to the mixture to form a paste of the mixture. The paste was then coated on a copper foil (Product number—Oak Mitsui TLB-DS), and passed through a rolling mill to achieve a 4 mil thickness. The calendared electrodes were punched to make 14 mm diameter circular electrodes. The punched electrodes were the dried 16 hrs at 120° C. under vacuum.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was NKK-4425 separator. The 5 mg of lithium composite powder (LCP is used for pre-doping the anode) was coated on an anode made from Timcal TB-17 graphite powder.

The cell was then crimped on a MTI coin cell crimper and conditioned on an Arbin BT 2000 at a constant current charge/discharge at 0.5 mA current from 3.8V to 2.2V. The cell with Timcal TB-17 graphite powder gave a discharge capacity of 48.46 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the Timcal TB-17 graphite powder on a volume basis. The cell had a maximum energy density of 36.69 Wh/l.

Comparative Example 3

Coconut Shell Sourced Carbon (600° C. Carbonization; HCl Treatment; and Second 600° C. Treatment) Coconut shell granules were acquired from Reade Materials and carbonized to 600° C. for 2 hrs under nitrogen conditions. The resulting carbon was then ground to 5 micron particle size. The ground carbon was then washed with 1N HCl 16 hrs followed by washes with distilled water to pH 5. The washed carbon was then heat treated at 600° C. for 2 hrs under nitrogen. The resulting heat treated carbon was subjected to Raman spectroscopy for structure analysis. The stacked Raman spectra are shown in FIG. 1. The heat treated carbon had an $I_D$ peak (disorder peak) at 1334.48 cm$^{-1}$ with an intensity of 2328.612 a.u., and an $I_G$ peak at approximately 1587.88 cm$^{-1}$ with an intensity of 2002.222 a.u. (Table 1). The peak ratio of $I_D/I_G$ was 1.16. The heat treated carbon was subjected elemental analysis as in Comparative Example 1. found: C: 94.10%; H: 2.12%; N: 0.15%; and O: 2.88%.

The heat treated carbon was used in casting anode electrodes for a lithium ion capacitor. The anode electrode consisted of 90 wt. % of the heat treated coconut shell sourced carbon, 5 wt. % Timcal Super C-45 conductive carbon, and 5 wt. % of KYNAR 761 grade PVDF (molecular weight: 300,000 to 400,000) as a binder.

The anode was prepared as follows. 3.6 grams of the heat treated coconut shell sourced carbon and 0.2 grams of Timcal Super C-45 were balled milled in a Retsch PM-100 ball mill for 15 mins at 350 rpm. 0.2 grams of PVDF was added to the heat treated coconut shell sourced carbon and Timcal Super C-45 mixture and ball-milled for 15 mins at 350 rpm. Next 6 mL of N-methyl pyrrolidinone (NMP) was added to the mixture. The mixture was again ball-milled for 20 minutes at 350 rpm. The slurry after ball-milling was rod coated on a copper foil (Product number—Oak Mitsui TLB-DS). The coated electrodes were dried under vacuum at 25° C. for 16 hrs. The dried electrodes were then calendared to the desired thickness of 4 mil. (the current collector thickness was not included in 4 mils). The calendared electrodes were punched to make 14 mm diameter circular electrodes. The punched electrodes were then dried for 16 hrs at 120° C. under vacuum.

A Li ion capacitor was built in a CR2032 format cell. The cathode comprised 85% of the abovementioned Corning carbon, 10% PTFE (DuPont 601A Teflon PTFE), and 5% Cabot Black Pearl 2000. The separator was NKK-4425 separator. The 5 mg of the abovementioned lithium composite powder (LCP is used for pre-doping the anode) was coated on an anode made from coconut shell sourced carbon treated at 600° C.

The cell was then crimped on a MTI coin cell crimper and conditioned on an Arbin BT 2000, at constant current charge/discharge at 0.5 mA from 3.8V to 2.2V. The coconut shell sourced carbon gave a discharge capacity of 18.208 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the comparative coconut shell sourced carbon (600° C.; HCl; 600° C.) on volume basis. The cell showed a maximum energy density of 16.31 Wh/l.

Example 4

Coconut Shell Sourced Carbon (with HCl Wash and $2^{nd}$ 1000° C. Treatment).

Coconut flour 200 mesh was acquired from Reade Materials. The flour was then carbonized to 1000° C. for 2 hrs under nitrogen. The resulting carbon was then ground to 5 micron particle size. The ground carbon was then washed with 1N HCl 16 hrs followed by washes with distilled water to pH 5. The carbon was then heat treated to 1000° C. for 2 hrs under nitrogen. The resulting heat treated carbon was subjected to Raman spectroscopy for structure analysis. The stacked Raman spectra are shown in FIG. 1. The heat treated carbon had an $I_D$ peak (disorder peak) at 1305.47 cm$^{-1}$ with an intensity of 3445.148 a.u., and an $I_G$ peak at approximately 1599.91 cm$^{-1}$ with an intensity of 1928.368 a.u. (Table 1). The peak ratio of $I_D/I_G$ was 1.79. The heat treated carbon was subjected to elemental analysis as in Comparative Example 1. found: C: 94.48%; H: 0.14%; N: 0.45%; and O: 1.42%. The heat treated carbon was also subjected to BET analysis to probe the surface area of the carbon, which was 27.5834 m$^2$/gm.

The resulting heat treated carbon was used in casting anode electrodes for lithium ion capacitor. The anode consisted of 90 wt % of the heated treated coconut shell carbon, 5 wt % Timcal Super C-45 conductive carbon, and 5 wt % of KYNAR HSV 900 grade PVDF (molecular weight: 1,000,000) as a binder.

The anode was prepared as follows. 3.6 grams of the heated treated coconut shell carbon and 0.2 grams of Timcal Super C-45 were balled milled in a Retsch PM-100 ball mill for 15 mins at 350 rpm. 0.2 grams of PVDF was added to the mixture and ball-milled for an additional 15 mins at 350 rpm. A few drops of N-methyl pyrrolidinone (NMP) were added to the mixture to form a paste. The paste was then coated on a copper foil (Product number—Oak Mitsui TLB-DS) and passed through a rolling mill to achieve a thickness of 2.75 mil.

A Li ion capacitor was built in a CR2032 format cell. The cathode comprised 85% of the abovementioned Corning carbon, 10% PTFE (DuPont 601A Teflon PTFE), and 5% Cabot Black Pearl 2000. The separator was NKK-4425 separator. The 5 mg of the above mentioned lithium composite powder (LCP is used for pre-doping the anode) was coated on an anode made from coconut shell sourced carbon treated at 1000° C.

The cell was then crimped on a MTI coin cell crimper and conditioned on an Arbin BT 2000 at a constant current charge/discharge at 0.5 mA current from 3.8V to 2.2V. The heat treated coconut shell based carbon gave a discharge capacity of 70.60 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the heat treated (1000° C.) coconut shell sourced carbon on a volume basis. The cell showed maximum energy density of 47.66 Wh/l.

Example 5

Coconut Shell Sourced Carbon (with HCl Wash and Second 1200° C. Treatment) Example 4 was repeated with the exception that the acid washed carbon was heat treated to 1200° C. for 2 hrs under nitrogen. The resulting carbon had an $I_D$ peak (disorder peak) at 1308.47 cm$^{-1}$ with an intensity of 4675.030 a.u. and an $I_G$ peak at approximately 1595.84 cm$^{-1}$ with an intensity of 3150.750 a.u. (Table 1). The peak ratio of $I_D/I_G$ was 1.48. The heat treated carbon (1200° C.) was subjected to elemental analysis as in Comparative Example 1. found: C: 98.44%; H: 0.13%; N: 0.44%; and O: 0.75%.

The resulting carbon was used in casting anode electrodes for a lithium ion capacitor as in Example 4 with the following particulars being noted: 90 wt % of coconut shell sourced carbon, 5 wt % Timcal Super C-45 conductive carbon, and 5 wt % KYNAR 761 grade PVDF (molecular weight: 1,000,000) as a binder. The coated slurry on copper foil was passed through a rolling mill to achieve a 2.75 mil thickness.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was NKK-4425 separator. The 3.5 mg of the above mentioned lithium composite powder (LCP is used for pre-doping the anode) was coated on an anode made from coconut shell sourced carbon treated at 1200° C.

The cell was then crimped on a MTI coin cell crimper and conditioned on an Arbin BT 2000 at constant current charge/discharge at 0.4 mA current from 3.8V to 2.2V. The cell had a discharge capacity of 96.32 mAh/gm (based on the anode carbon weight) after the third conditioning cycle (FIG. 2). The cell was subjected to C-Rate performance where the cell was charged at a constant current of 1 mA and discharged at different rates. FIG. 3 shows the C-rate performance of the heat treated (1200° C.) coconut shell sourced carbon on a volume basis. The cell showed maximum energy density of 44.77 Wh/l.

Example 6

Coconut Shell Based Carbon (with HCl Wash and $2^{nd}$ 1400° C. Treatment)

Example 4 was repeated with the exception that the acid washed carbon was heat treated to 1400° C. for 2 hrs under nitrogen. The resulting carbon had an $I_D$ peak (disorder peak) at 1310.26 cm$^{-1}$ with an intensity of 6678.350 a.u., and an $I_G$ peak at about 1604.15 cm$^{-1}$ with an intensity of 4126.940 a.u. (Table 1). The peak ratio of $I_D/I_G$ was 1.62.

The heat treated carbon (1400° C.) was subjected to elemental analysis as in Comparative Example 1. found: C: 99.66%; H: 0.09%; N: 0.16%; and O: 0.09%. The coconut shell sourced carbon treated at 1400° C. was also subjected to BET analysis to probe the surface area of the carbon, which was 10.9606 m$^2$/gm.

The resulting carbon was used in casting anode electrodes for a lithium ion capacitor as in Example 4 with the following particulars being noted: 90 wt % of coconut shell carbon, 5 wt % Timcal Super C-45 conductive carbon, and 5 wt % KYNAR 761 grade PVDF (molecular weight: 1,000,000) as a binder. The coated slurry on copper foil was passed through a rolling mill to achieve a 2.75 mil thickness.

A Li ion capacitor was built in a CR2032 format cell. The cathode comprised 85% of the abovementioned Corning carbon, 10% PTFE (DuPont 601A Teflon PTFE), and 5% Cabot Black Pearl 2000. The separator was NKK-4425 separator. 3.5 mg of the abovementioned lithium composite powder (LCP is used for pre-doping the anode) was coated on an anode made from coconut shell sourced carbon treated at 1400° C.

The cell was then crimped on a MTI coin cell crimper and conditioned on an Arbin BT 2000 at constant current charge/discharge at 0.5 mA current from 3.8V to 2.2V. The cell had a discharge capacity of 88.64 mAh/gm (based on the anode carbon weight) after the third conditioning cycle (FIG. 2). The cell was subjected to C-Rate performance where the cell is charged at a constant current of 1 mA and discharged at different rates. FIG. 3 shows the C-rate performance of the heat treated (1400° C.) coconut shell sourced carbon on a volume basis. The cell had a maximum energy density of 41.56 Wh/l.

Example 7

Coconut Shell Based Carbon (with HCl Wash and 2$^{nd}$ 1600° C. Treatment)

Example 4 was repeated with the exception that the acid washed carbon was heat treated to 1600° C. for 2 hrs under nitrogen. The resulting carbon had an $I_D$ peak (disorder peak) at 1306.63 cm$^{-1}$ with an intensity of 7450.380 a.u., and an $I_G$ peak at about 1601.58 cm$^{-1}$ with an intensity of 4139.710 a.u. (Table 1). The peak ratio of $I_D/I_G$ was 1.80. The heat treated carbon (1500° C.) was subjected to elemental analysis as in Comparative Example 1. found: C: 99.66%; H: 0.08%; N: 0.08%; and O: less than 0.1%. The coconut shell sourced carbon treated at 1400° C. was also subjected to BET analysis to probe the surface area of the carbon, which was 8.5450 m$^2$/gm.

The resulting carbon was used in casting anode electrodes for a lithium ion capacitor as in Example 4 with the following particulars being noted: 90 wt % of heat treated (1600° C.) coconut shell carbon, 5 wt % Timcal Super C-45 conductive carbon, and 5 wt % KYNAR 761 grade PVDF (molecular weight: 1,000,000) as a binder. The coated slurry on copper foil was passed through a rolling mill to achieve a 2.75 mil thickness.

A Li ion capacitor was built in a CR2032 format cell. The cathode comprised 85% of the abovementioned Corning carbon, 10% PTFE (DuPont 601A Teflon PTFE), and 5% Cabot Black Pearl 2000. The separator was NKK-4425 separator. 3.5 mg of the abovementioned lithium composite powder (LCP is used for pre-doping the anode) was coated on an anode made from coconut shell sourced carbon treated at 1600° C.

The cell was then crimped on a MTI coin cell crimper and conditioned on Arbin BT 2000 at constant current charge/discharge at 0.5 mA current from 3.8V to 2.2V. The cell gave a discharge capacity of 105.394 mAh/gm (based on the anode carbon weight) after the third conditioning cycle (FIG. 2). The cell was subjected to C-Rate performance where the cell is charged at a constant current of 1 mA and discharged at different rates. FIG. 3 shows the C-rate performance of the heat treated (1600° C.) coconut shell based carbon on a volume basis. The cell had a maximum energy density of 48.032 Wh/l.

Example 8

Coconut Shell Sourced Carbon (with No Wash and No Second 1000° C. Heat Treatment) Example 4 was repeated with the exception that the carbon was not acid washed, did not receive a second heat treatment, there was no Raman analysis, and there was no elemental analysis. The resulting carbon was used in casting anode electrodes for a lithium ion capacitor as in Example 4 with the following particulars being noted: 90 wt % of the coconut shell sourced carbon of this Example, 5 wt % Timcal Super C-45 conductive carbon, and 5 wt % of KYNAR 761 grade PVDF (molecular weight: 300,000 to 400,000) as a binder. The coated slurry on copper foil was passed through a rolling mill to achieve a 4 mil thickness. The current collector is not included in the 4 mils thickness.

A Li ion capacitor was built in a CR2032 format cell. The cathode comprised 85% of the above mentioned Corning carbon, 10% PTFE (DuPont 601A Teflon PTFE), and 5% Cabot Black Pearl 2000. The separator was NKK-4425 separator. The 5 mg of lithium composite powder (LCP is used for pre-doping the anode) was coated on an anode made from coconut shell sourced carbon (carbonized at 1000° C.).

The cell was then crimped on a MTI coin cell crimper and conditioned on an Arbin BT 2000 at constant current charge/discharge at 0.4 mA current from 3.8V to 2.2V. The cell had a discharge capacity of 65.971 mAh/gm (based on the anode carbon weight) after the third conditioning cycle (FIG. 4). The cell was subjected to C-Rate performance where the cell was charged at a constant current of 1 mA and discharged at different rates. FIG. 5 shows the C-rate performance of the coconut shell sourced carbon on a volume basis. The cell showed maximum energy density of 40.35 Wh/l.

Example 9

Coconut Shell Based Carbon (with HCl Wash and No Second 1000° C. Treatment) Example 4 was repeated with the exception that the carbon did not receive a second heat treatment, there was no Raman analysis, and there was no elemental analysis. The resulting carbon was used in casting anode electrodes for a lithium ion capacitor as in Example 4 with the following particulars being noted: 90 wt % of the coconut shell sourced carbon of this Example, 5 wt % Timcal Super C-45 conductive carbon, and 5 wt % KYNAR 761 grade PVDF (molecular weight: 300,000 to 400,000) as a binder. The coated slurry on copper foil was passed through a rolling mill to achieve a 4 mil thickness (the current collector thickness is not included in the 4 mils).

A Li ion capacitor was built in a CR2032 format cell. The cathode comprised 85% the above mentioned Corning carbon, 10% PTFE (DuPont 601A Teflon PTFE), and 5% Cabot Black Pearl 2000. The separator was a NKK-4425 separator. 5 mg of the above mentioned lithium composite powder (LCP is used for pre-doping the anode) was coated on an anode made from coconut shell sourced carbon (carbonized at 1000° C. and washed with HCl).

The cell was then crimped on a MTI coin cell crimper and conditioned on an Arbin BT 2000 at constant current charge/discharge at 0.4 mA current from 3.8V to 2.2V. The cell had a discharge capacity of 50.31 mAh (based on the anode carbon weight) after the third conditioning cycle (FIG. 4). The cell was subjected to C-Rate performance where the cell is charged at a constant current of 1 mA and discharged at different rates. FIG. 5 shows the C-rate performance of the coconut shell sourced carbon (1000° C.) on volume basis. The cell showed maximum energy density of 45.58 Wh/l.

Example 10

Coconut Shell Sourced Carbon (Treatment of Raw Coconut Granules with HCl Followed by Carbonization at 1000° C.) Example 4 was repeated with the exception that the coconut shell sourced carbon was raw coconut granules that were treated with aqueous 1N HCl followed by carbonization at 1000° C. Specifically, coconut shell granules were washed with 1N HCl for 16 hrs and rinsed with distilled water until a pH of 5. The resulting HCl treated powder was then carbonized to 1000° C. for 2 hrs under nitrogen.

The resulting carbon was used in casting anode electrodes for a lithium ion capacitor as in Example 4 with the following particulars being noted: 90 wt % of the coconut shell sourced carbon of this Example, 5 wt % Timcal Super C-45 conductive carbon, and 5 wt % KYNAR 761 grade PVDF (molecular weight: 300,000 to 400,000) as a binder. The coated slurry on copper foil was passed through a rolling mill to achieve a 4 mil thickness (the current collector thickness is not included in the 4 mils).

A Li ion capacitor was built in a CR2032 format cell. The cathode comprised 85% of the abovementioned Corning carbon, 10% PTFE (DuPont 601A Teflon PTFE), and 5% Cabot Black Pearl 2000. The separator was NKK-4425 separator. 5 mg of the abovementioned lithium composite powder (LCP is used for pre-doping the anode) was coated on an anode made from coconut shell sourced carbon (i.e., raw coconut shell washed with HCl and then carbonized at 1000° C.).

The cell was then crimped on a MTI coin cell crimper and conditioned on an Arbin BT 2000 at constant current charge/discharge at 0.4 mA current from 3.8V to 2.2V. The cell had a discharge capacity of 69.61 mAh (based on the anode carbon weight) after the third conditioning cycle (FIG. 4). The cell was subjected to C-Rate performance where the cell is charged at a constant current of 1 mA and discharged at different rates. FIG. 5 shows the C-rate performance of the coconut shell sourced carbon of this example on a volume basis. The cell had a maximum energy density of 44.11 Wh/l.

The inventive carbon materials were characterized by: Raman analysis to have a peak intensity ratio of $I_D/I_G$ from 1.40 to 1.85; and elemental analysis to have a hydrogen content of from 0.01 to 0.25 wt %; a nitrogen content of from 0.01 to 0.55 wt %; and an oxygen content of from 0.01 to 2 wt %.

The disclosure has been described with reference to various specific embodiments and techniques. However, it should be understood that many variations and modifications are possible while remaining within the scope of the disclosure.

TABLE 1

Comparison of Raman Intensities (I) for the Disorder ($I_D$) peak and Graphitic peak ($I_G$) and peak ratios ($I_D/I_G$) for different carbons.

| Carbon | $I_D$ (a.u) | $I_G$ (a.u) | $I_D/I_G$ |
|---|---|---|---|
| Comp. Ex. 1 (Phenolic Resin 660° C.) | 2339.745 | 1952.962 | 1.20 |
| Comp. Ex. 2 (Timcal Graphite)- | 3019.060 | 2000.583 | 1.51 |
| Comp. Ex. 3 (Coconut Char 600° C.) | 2328.612 | 2002.222 | 1.16 |
| Ex. 4 (Coconut Char 1000° C.) | 3445.148 | 1928.368 | 1.79 |
| Ex. 5 (Coconut Char 1200° C.) | 4675.030 | 3150.750 | 1.48 |
| Ex. 6 (Coconut Char 1400° C.) | 6678.350 | 4126.940 | 1.62 |
| Ex. 7 (Coconut Char 1600° C.) | 7450.380 | 4139.710 | 1.80 |

TABLE 2

Comparison of relative carbon, hydrogen, nitrogen, and oxygen weight percentages in different carbons.

| Example Number | Carbon % | Hydrogen % | Nitrogen % | Oxygen % |
|---|---|---|---|---|
| Comparative Ex. 1 (Phenolic Resin 660° C.) | 95.27 | 1.76 | 0.1 | 2.11 |
| Comparative Ex. 2 (Timcal-Graphite) | 99.44 | 0.27 | 0.02 | <0.1 |
| Comparative Ex. 3 (Coconut Char 600° C.) | 94.10 | 2.12 | 0.15 | 2.88 |
| Ex. 4 (Coconut Char 1000° C.) | 94.48 | 0.14 | 0.45 | 1.42 |
| Ex. 5 (Coconut Char 1200° C.) | 98.44 | 0.13 | 0.44 | 0.75 |
| Ex. 6 (Coconut Char 1400° C.) | 99.66 | 0.09 | 0.16 | 0.09 |
| Ex. 7 (Coconut Char 1600° C.) | 99.66 | 0.08 | 0.08 | <0.1 |

What is claimed is:

1. A method of making a carbon composition comprising:
a first heating of a coconut shell sourced carbon at from 10004C to 1700*C for from
0.5 hrs to 5 hrs in an inert atmosphere;
grinding the resulting carbon to a powder;
washing the resulting powder with an aqueous acid; and
a second heating of the acid washed powder at from 1000 to 1700 ° C.

2. The method of claim 1 wherein the first heating and the second heating are accomplished at from 1000 to 1600 ° C. for 1to 3hrs.

3. The method of claim 1 wherein at least one of the first heating and the second heating is accomplished at 1100 to 1300° C.

4. The method of claim 1 wherein at least one of the first heating and the second heating is accomplished at 1300 to 1500° C.

5. The method of claim 1 wherein at least one of the first heating and the second heating is accomplished at from 1500 to 1700° C.

* * * * *